United States Patent

[11] 3,615,961

| | | | |
|---|---|---|---|
| [72] | Inventors | Erwin Meyer; Klaus Diether Brendel, both of Goettingen, Germany | |
| [21] | Appl. No. | 430,850 | |
| [22] | Filed | Feb. 8, 1965 | |
| [45] | Patented | Oct. 26, 1971 | |
| [73] | Assignee | Gruenzweig & Hartmann AG Ludwigshafen, Germany | |
| [32] | Priorities | Feb. 7, 1964 | |
| [33] | | Germany | |
| [31] | | M 59837; Sept. 10, 1964, Germany, No. M 62390 | |

[54] SOUND ABSORBER AND METHOD OF MAKING THE SAME
3 Claims, 11 Drawing Figs.

[52] U.S. Cl. .................................................. 156/62.2, 181/33, 156/327
[51] Int. Cl. ...................................................... B32b 27/04, B32b 27/14, B32b 27/40
[50] Field of Search ............................................ 181/33, 33.1, 33.11; 156/60, 331, 327, 62.2

[56] References Cited
UNITED STATES PATENTS

| 1,870,101 | 8/1932 | Davey | 181/33 (.1) |
|---|---|---|---|
| 2,184,482 | 12/1939 | Austin et al. | 181/33 (.1) |
| 2,304,717 | 12/1942 | Swart | 181/33 (.1) |
| 3,024,701 | 3/1962 | Marks et al. | 181/33 (.1) |
| 3,078,948 | 2/1963 | Gildard et al. | 181/33 (.1) |
| 3,079,277 | 2/1963 | Painter | 181/33 (.1) |
| 3,087,568 | 4/1963 | Kurtze | 181/33 (.1) |
| 3,117,054 | 1/1964 | Antonucci | 181/33 (.1) |
| 3,124,639 | 3/1964 | Kahn | 181/33 (.1) |
| 2,087,248 | 7/1937 | Fischer | 181/33 (.1) |
| 2,223,289 | 11/1940 | Lyons | 181/33 (.11) |
| 2,811,216 | 10/1957 | Harris | 181/33 (.1) |
| 2,866,730 | 12/1958 | Potchen et al. | 181/33 (.11) |
| 3,056,707 | 10/1962 | Helbing et al. | 181/33 (.1) |
| 3,072,582 | 1/1963 | Frost | 181/33 (.11) |
| 3,127,363 | 3/1964 | Nitzsche et al. | 181/33 (.11) |
| 3,160,549 | 12/1964 | Caldwell et al. | 181/33 (.1) |
| 3,061,491 | 10/1962 | Sherrard et al. | 181/33 (.1) |
| 3,143,457 | 8/1964 | Morris | 181/33 (.1) |
| 3,087,569 | 4/1963 | Kurtze | 181/33 (.1) |
| 3,087,571 | 4/1963 | Kerwin | 181/33 (.1) |
| 3,421,597 | 1/1969 | Balu et al. | 181/33 (.1) |

FOREIGN PATENTS

| 824,247 | 11/1937 | France | 181/33 (.1) |
|---|---|---|---|
| 810,505 | 3/1959 | Great Britain | 181/33 (.1) |
| 325,002 | 12/1957 | Switzerland | 181/33 (.1) |

OTHER REFERENCES

G. Kurtze et al., " New Wall Design for High Transmission Loss or High Damping," The Journal of the Acoustical Society of America, Vol. 31, No. 6, June 1959, pp. 739– 748. Class 181–33.11.

E. M. Kerwin, " Damping of Flexural Waves by a Constrained Viscoelastic Layer," The Journal of the Acoustical Society of America, Vol. 31, No. 7, July 1959, pp. 952– 962. Class 181–33.11.

*Primary Examiner*—Robert S. Ward, Jr.
*Attorney*—Michael S. Striker

ABSTRACT: A sound absorber is formed of an oscillatable material having a surface exposed to the sound waves which move in a given direction, a material which will cause oscillation of the oscillatable material which occurs upon the impact of sound waves thereon to take place in a direction transverse to the given direction, and a material causing dampening of oscillations which is in engagement with the oscillatable material or the material causing change in the direction of the oscillations and capable of dampening the transverse oscillations.

PATENTED OCT 26 1971

INVENTORS
ERWIN MEYER
KLAUS DIETHET BRENDEL

BY *Michael S. Strike*
ATTORNEY

INVENTORS
ERWIN MEYER
KLAUS DIETHET BRENDEL

BY

*Michael S. Strike*

ATTORNEY

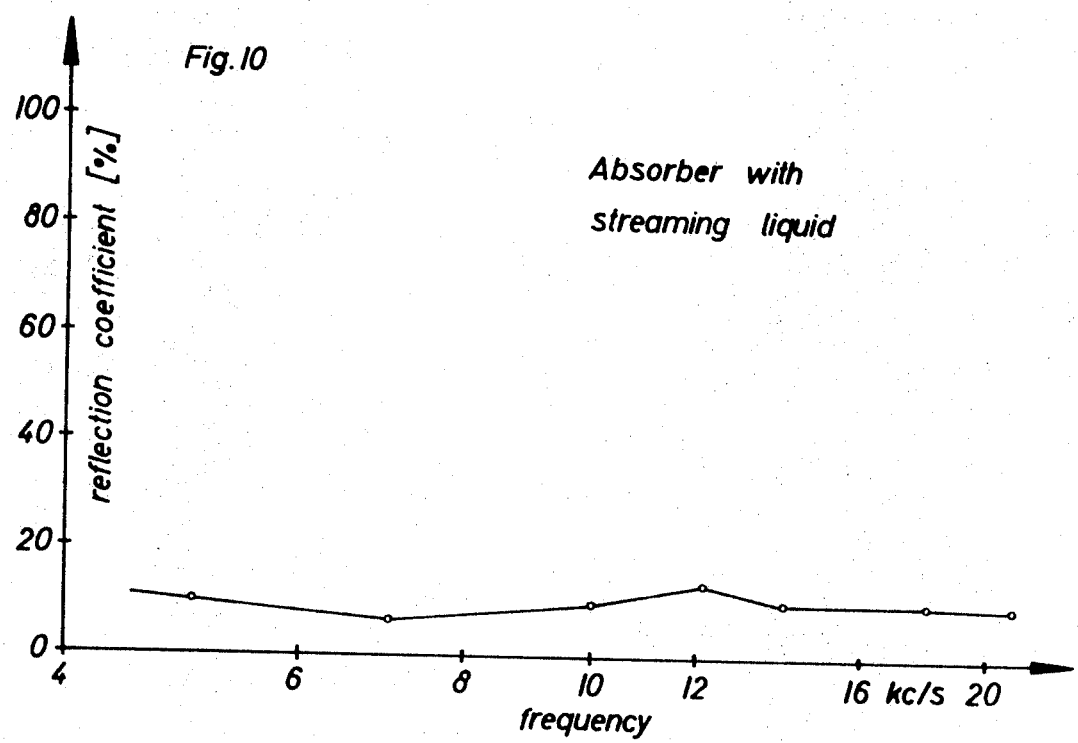
Fig. 10 Absorber with streaming liquid
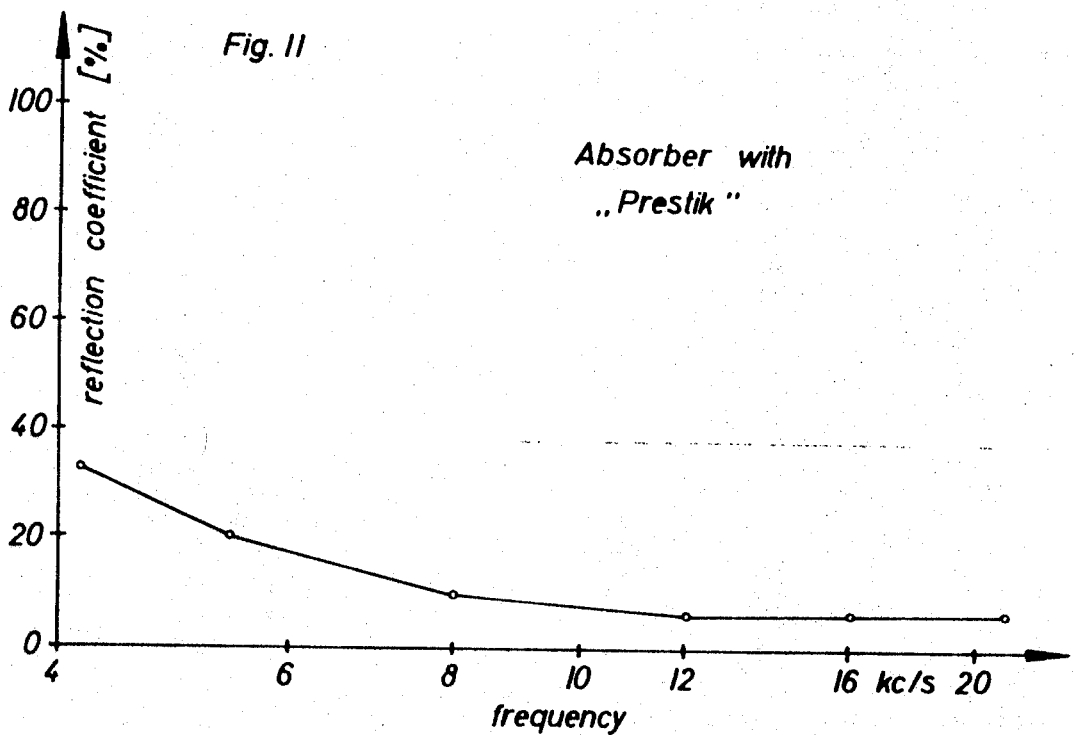
Fig. 11 Absorber with "Prestik"

SOUND ABSORBER AND METHOD OF MAKING THE SAME

The present invention relates to a sound absorber and method of making the same and, more particularly, the present invention is concerned with sound absorbers which are adapted to absorb sound waves of a broad range of frequency and which may be transmitted through a liquid or solid medium.

Various types of sound absorbers for absorbing a broad range of frequencies of structure or fluid-borne sound are known. For the absorption of fluid-borne sound, particularly wedge and ribbed absorbers are used which are formed of dissipative materials, e.g., materials the deformation of which leads to internal dissipation losses, such as rubber or rubberlike plastics, in contrast to, for example, steel springs where deformation energy may be stored and recovered substantially without dissipation losses. They are used for lining reflection-free water tanks and the like. For sound waves which pass through solid material, sound absorbers are known which consist of loose more or less bound poured granular materials. Furthermore, also rubberlike materials fused or softened by heating in order to obtain a gradual increase of dissipation are used for this purpose. It is possible to use several materials of different properties simultaneously, each having its maximum dissipation at another temperature.

Absorbers for structure or fluid-borne sound, particularly for sound waves transmitted through solid or liquid media are used in measuring techniques, for instance as a nonreflecting termination or a nonreflecting lining of vessels or rooms. Such arrangements are required for sound level measurements, measurements of directivity patterns and the like.

All of these arrangements have the disadvantage that when they are to be effective over a broad range of frequencies, the thickness of the sound absorber has to be considerable, commensurate to the wave length and thus such arrangements frequently are rather costly.

Each sound absorber is based on the following principle:

For the absorption of the sound, there is required, on the one hand, an adjustment of the medium through which the sound wave passes on the absorbing layer and, on the other hand, the sound energy which is introduced into the absorbing layer must be irreversibly converted into another form of energy.

It is extremely difficult to comply with the last-mentioned condition, namely, the complete, irreversible conversion of the sound energy to another energy form, when the sound absorber is to consist of a relatively thin layer or layers. The up to now known absorption materials do not show a sufficiently high inner loss of sound energy. The possibility of achieving in the absorber layer an increased deformation as a result of shearing or tangentially acting stresses, as can be accomplished by incorporation resonance systems in the absorber layer, and thereby to achieve increased sound energy losses, necessarily leads to limiting the absorber layer to a relatively narrow band of frequencies. This is due to the fact that in resonance systems the required real input impedance is achieved by resonance mechanisms and hence only in the near vicinity of the corresponding resonant frequency.

It is therefore an object of the present invention to overcome the above discussed difficulties and disadvantages of the prior art sound absorbers.

It is a further object of the present invention to provide a sound absorber of relatively simple structure which can be economically produced and which will be highly effective over a broad range of frequencies.

It is yet another object of the present invention to provide a sound absorber consisting of a relatively thin layer and nevertheless effective over a broad range of frequencies.

It is a particular object of the present invention to provide sound absorbers for absorbing sound transmitted through solid and liquid media, which meet the above objects.

Other objects and advantages of the present invention will become apparent from a further reading of the description and of the appended claims.

With the above and other objects in view, the present invention contemplates a sound absorber comprising, in combination, oscillatible means having a surface exposed to sound waves moving in a first direction, means for causing the oscillation of the oscillatible means, caused by the sound waves, to take place in a second direction transverse to the first direction, and dampening means engaged by one of the means to dampen the transverse oscillation.

According to a preferred embodiment of the present invention, a sound absorber adapted to absorb sound waves of a broad range of frequencies transmitted through liquid and solid media comprises a layer of incompletely cross-linked, cross-linkable, dissipative, synthetic material having bodies of compressible material incorporated therein.

The present invention also contemplates in a method of producing a sound absorber adapted to absorb sound waves of a broad range of frequencies, the steps of simultaneously spraying onto a support through a plurality of spray guns a carrier material, a liquid and a compressible material, so as to form on the support a layer of the carrier material having the liquid and the compressible material distributed therethrough.

According to another embodiment, the method of the present invention for producing a sound absorber adapted to absorb sound waves of a broad range of frequencies, comprises the steps of applying an adhesive layer to a support, adhering by means of the adhesive layer to the support a plurality of compressible closed cell cellular bodies, and applying to the adhesive layer with the compressible bodies thereon a coating of an incompletely cross-linked, cross-linkable strongly dissipative material without forming gas bubbles within the same, so as to completely cover the support and the compressible bodies.

Thus, the present invention provides a sound absorber which even when of relatively thin structure will be effective over a broad range of frequencies. By broad range absorption of sound it is meant that the absorption will be effective over more than about one octave of frequency range.

The present invention is based on the finding that a broad range of highly effective sound absorption can be obtained by conversion of the sound energy into the energy of a flowing liquid, flowing in a relatively thin layer, or in the energy of the plastic deformation of a suitable material. In thin layers of liquid, the flow resistance and thus the losses due to viscosity are high when the liquid is forced to flow in such thin layers.

The present invention provides a broad frequency range sound absorber with means which preferably in a direction perpendicular to the direction of the sound waves which are to be absorbed produce a back and forth movement or an oscillating movement of the liquid within the absorber layers, which movement is then weakened by friction or other losses of suitable magnitude. It is essential according to the present invention that strong components of the flow will be forced in a direction which is not only transverse, but preferably perpendicular to the direction of the sound waves. Especially when such direction of flow is perpendicular to the direction of the sound waves, the absorber structure can be very thin. In place of a more or less viscous liquid, it is also possible to use a material of plastic or pliable consistency. For instance, if water is used as the liquid in the absorbing layer, the thickness of the layer must be very small so that the pressure exerted by the sound waves will cause a considerable increase in the alternating particle velocity. This can be accomplished, for instance, by forming a thin layer of water which is covered in the direction towards the impinging sound waves and which also contains compressible occlusions, for instance air bubbles. This layer is arranged in front of the wall or the like which is to be provided with a sound absorbing layer. The sound waves effect in the liquid layer by transformation a high speed oscillating or back and forth movement of the liquid. Due to friction at the boundary lines, the energy of the sound waves which has been transformed into the movement of the liquid is then more or less destroyed and converted into heat. It is possible thereby, by suitable adjusting the thickness of the liquid layer and the viscosity of the liquid, to adjust the input impedance of the arrangement to the wave impedance of the medium through which the sound waves pass. Thus, it could also be said that the present invention is concerned with a novel flow absorber in which the transformation of the alternating particle velocity, i.e. the speed of dislocation of the particles forming this medium, in a plane preferably perpendicular to the direction of incident waves, plays an important part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 7:
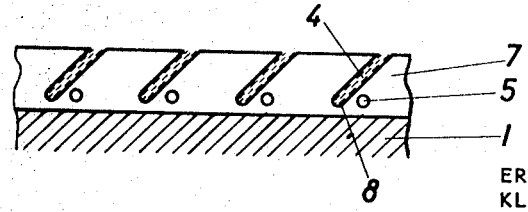
Figure 8:
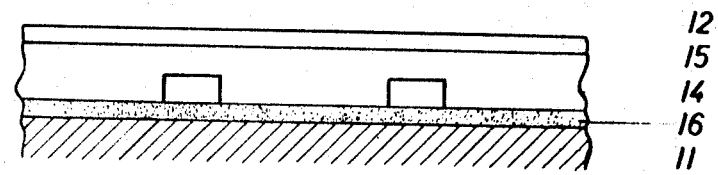
Figure 9:
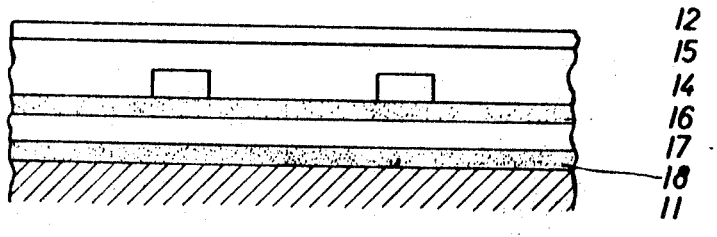

FIG. 7 is a similar view of yet a further embodiment of a sound absorber according to the present invention which is particularly suitable for absorbing sound passing through a liquid medium and which shows compressible inclusions in the carrier material of the sound absorber and indentations in the surface of the carrier layer which is in contact with the surrounding liquid, which indentations thus will be filled with surrounding liquid;

FIG. 8 is a similar view of still another sound absorber according to the present invention showing a layer of incompletely cross-linked, cross-linkable material covered with a liquid-resistant layer or coating and including closed cell, cellular compressible bodies;

FIG. 9 is a similar view of still a further sound absorber according to the present invention in which the sound absorber of FIG. 8 is adhered to or mounted on a foil which in turn is adhered to the wall which is to be protected against the impact of sound waves;

FIG. 10 is a typical sound absorption curve showing the reflection coefficient for different frequencies as achieved with sound absorbers of the type illustrated in FIGS. 1–7; and FIG. 11 is a typical sound absorption curve showing the reflection coefficient for different frequencies as achieved with sound absorbers of the type illustrated in FIGS. 8 and 9.

Generally, the sound absorber of the present invention which is adapted to absorb sound waves of a broad range of frequencies is so constructed that behind a surface layer which is contacted by the sound waves which are to be absorbed, a thin layer of liquid and/or material in plastic condition is arranged and that compressible inclusions are provided therein. Due to the compressible inclusions a flow of the flowable material can be forced which would not be the case without such compressible inclusions due to the substantial incompressibility of liquids and materials in plastic condition. In order to obtain an oscillating flow of the materials in the flowable or transformable layer, such compressible inclusions are required so that upon compression and reduction of the volume of the same, the flowing substance may penetrate into the area previously occupied by the compressible bodies but now, after compression of the compressible bodies, is no longer filled with the same. The surface layer serves not only for covering the thin liquid layer but also for a good matching between the medium through which the sound waves pass and which contacts the surface layer and the oscillating liquid so as to assure the desired small reflection at the interface. The use of materials in plastic condition instead of a liquid frequently gives good effects due to the higher viscosity of the plastic material which preferably will have a viscosity within the range of between $10^4$ and $10^6$ centipoises. Many commercially available plastic materials are within this viscosity range or may be adapted to this viscosity range by means of plasticizers, cross-linking, and in other ways known to those skilled in the art.

The compressible inclusions-containing layer of liquid and/or material in plastic condition need not be one coherent layer but, to the contrary, it is frequently advantageous to subdivide this layer into discrete portions which are arranged in a carrier material. By thus subdividing the oscillating layer, a larger frictional surface is obtained as well as a better distribution of the liquid over the entire wall which is to be covered by the sound absorber. At the same time the interspaces between the individual discrete liquid bodies will serve to give greater strength to the sound absorbing surface layer. The liquid or material in plastic condition which, as described above, is present in the form of separate discrete bodies thereof is located in channels or narrow spaces. The individual channels or narrow spaces may be arranged adjacent to each other substantially in one plane or layer parallel to the cover layer, or some of these channels or narrow spaces may be located in superposed planes. The arrangement according to which the oscillatible material is located in small channels or narrow spaces has the advantage that the surface which surrounds the liquid or the material in plastic condition becomes relatively large as compared to the volume of the liquid or the like, whereby friction losses upon oscillation of the flowable material will increase. The geometric arrangement of the channels or narrow spaces in the carrier material is immaterial. Arranging the channels or narrow spaces in accordance with a regular pattern may facilitate production of the sound absorber. Irregular arrangement or statistical distribution of the oscillatible bodies may increase the range of frequency of sound waves which may be absorbed and it is also possible thereby to suitably change the frictional dependency of the reflected sound wave. The random or statistical arrangement of the bodies of increased compressibility will contribute not only to absorption of sound waves of a wider frequency range but also to a scattering of the reflected sound waves into different directions so that the reflection will be a diffused one. Preferably, the channels or narrow spaces are embedded in a carrier material which will be identical with the material forming the covering or surface layer and which may be integral with the same. Such carrier material preferably is a material of rubbery resiliency. This is particularly important when the compressed bodies are embedded in the carrier material and not in the oscillatible material such as a liquid or the like.

In such embodiment of the present invention, the compressible inclusions are arranged in the carrier material in the vicinity of the oscillatible, for instance liquid bodies, so that the liquid may flow under resilient deformation of the carrier material in the direction towards the compressible inclusions during compression of the same. By this additional resilient deformation of the carrier material, the loss of sound energy and thus the absorptive effect is increased.

The compressible inclusions may consist either of free gas bubbles or of gas bubbles covered by a thin skin, or also of gas-containing materials such as pieces of sponge, cork or the like.

The compressible inclusions need not be embedded in the liquid material in plastic condition or resilient carrier material, if they are located in indentations in the surface of the wall which is to be covered by the sound absorber. This is important in the production of the sound absorber of the present invention. The wall which is to be covered by the sound absorber need not be worked in any particular manner prior to covering the sound absorber. If the wall is formed with indentations in its surface which is to be covered, the compressible inclusions or occlusions of air or gas in such indentations will coact with the covering sound absorber.

According to another embodiment of the present invention, the sound absorber is formed with channels or narrow spaces which extend inwardly from the free surface of the sound absorber and are in contact with the outer space through which the sound waves pass towards the sound absorber. This type of sound absorber is particularly suitable for the absorption of liquid-borne sound. The carrier layer or material which is applied to the wall which is to be protected will then have to consist only of the resilient carrier material and of compressible inclusions embedded therein provided that a plurality of channels or narrow spaces are formed in the carrier material which open into the outer surface of the same which contacts the liquid through which the sound wave travels, so that a portion of this liquid will fill these indentations, channels or narrow spaces.

In order to be effective, the thickness of the oscillatible layer should be proportional to the viscosity of the oscillatible material such as a liquid or a material in plastic condition. The lower the viscosity of such material, the small should be the thickness of the layer formed thereof.

When materials with higher viscosity are used, such as softened viscous synthetic materials, for instance, the softened polyurethane plastics mentioned further above, the oscillatible layer formed thereof should have a somewhat greater thickness. Experiments have shown that the thickness of these layers in order to absorb sound waves within the hearing range will be of the magnitude of millimeters or fractions of millimeters and thus will be very small as compared to the wave length of the sound waves. Furthermore, it has been found that a very high degree of weakening of reflection of sound waves within the range of several octaves can be easily accomplished and that reflection coefficients of less than 10 percent can be achieved.

When it is desired to cover a resilient or sound-soft wall, which reflects 100 percent of the incident sound, with the broad range sound absorber of the present invention, then it is advisable to arrange between such sound absorber layer and the wall a further layer which consists of particles of heavy mass, i.e. of bodies of high specific gravity, having a specific density exceeding that of the incorporation medium, i.e. the carrier material of the sound absorber. In order not to impair the pliability or flexibility of the incorporating medium, the heavy particles, for example granules, small sheets and the like of lead, tungsten, uranium, barium sulfate, etc. are preferably arranged somewhat spaced from each other.

When it is desired to widen the effective range of the sound absorber arrangement of the present invention in the direction towards higher frequencies, then it is recommended to combine the absorber according to the present invention with the conventional ribbed absorbers which are known to those skilled in the art and have been described in many publications and which conventionally are used as a sound absorbing covering on walls exposed to liquid-borne sound. The combination of the conventionally ribbed absorbers with the sound absorber according to the present invention has the advantage that the thickness of the ribbed absorber can be greatly reduced as compared with the use of the ribbed absorber alone.

The sound absorbers according to the present invention may be produced by spraying methods. The material for the resilient carrier layer and for the liquid or flowable substance and the compressible bodies may be sprayed simultaneously by means of several spray guns against the wall which is to be covered. It is of course possible to mix the material for the carrier layer such as a self-hardening 2-component synthetic material and the liquid and then to spray this mixture through the nozzle of a spraying machine against the wall which is to be covered. Synthetic materials such as epoxy or polyester plastics may be used. It is also possible to apply this mixture by trowelling. Solid compressible inclusions which generally are of small dimensions, such as bodies of sponge, rubber or soft plastic foams, having a volume of between 0.1 and 1.0 cm.³ may either be admixed to the material which is to be sprayed prior to the spraying of the same, or they may be sprinkled onto the wall which is to be covered simultaneously with the spraying of the other constituents of the sound-absorbing layer. Another method of forming the sound-absorbing layer consists in spraying water against the wall which is to be covered or to subject the wall surface to contact with steam and thereafter spraying the carrier material against the wall.

When it is desired to adhesively adhere a previously produced sound absorber according to the present invention onto a wall, a more or less sheetlike carrier layer is used. Holes are formed in the carrier layer by means of a suitable roller. The layer is then either sprayed with liquid and/or solid compressible bodies which are sprinkled onto the same. Thereafter, the thus treated layer is calendered so as to mix the water and/or the compressible bodies into the carrier sheet.

Thus, for instance, the sheet of plastic 2 shown in FIG. 3 can be provided with holes or recesses 5 by rolling and the thus obtained product may be joined to plastic foil 6 by calendering; or a plastic sheet may be perforated and subsequently combined with an unperforated (cover layer) plastic foil 6, also by calendering.

The solid foam particles may also be spread over a plastic base layer and thereafter covered with another layer. The whole structure may be joined by calendering or the like, preferably with curing or setting of the materials to the desired extent.

Figure 1:
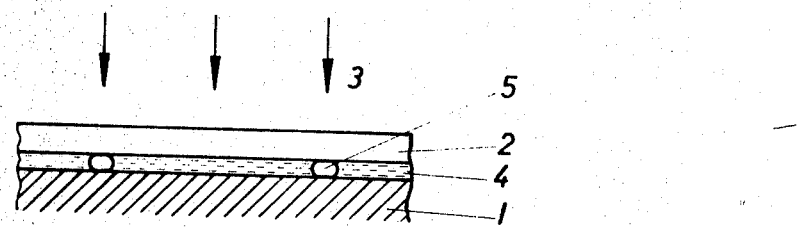
FIG. 1 is a fragmentary schematic cross-sectional elevation of a sound absorber according to the present invention comprising a surface layer and underneath the same a layer of liquid or synthetic material in plastic condition having compressible bodies incorporated therein.

Referring now again to the drawing, in particular to FIG. 1, wall 1 is shown which is to be covered with the sound absorbing arrangement according to the present invention which comprises a liquid layer 4 containing compressible inclusions 5, and a relatively rigid cover layer 2. Cover layer 2 is contacted by sound waves 3. Sound waves 3 exert pressure on cover layer 2 and this pressure causes a flow of the liquid in a direction perpendicular to the direction of the sound waves. The practically incompressible liquid flows into the space given up by the compressible inclusions upon compression of the same. In this manner, sound energy is converted into the energy of flowing liquid and by friction between the liquid and wall 1 as well as cover layer 2, and also by interior friction within the liquid, the energy of the flowing liquid is oscillatibly converted into heat.

Figure 2:
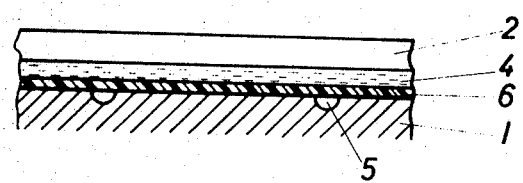
FIG. 2 is a similar view of another embodiment of the sound absorber according to the present invention in which the compressible bodies or inclusions are located in the surface portion of the wall which is to be provided with a sound absorbing covering.

FIG. 2 illustrates another embodiment of the sound absorber according to which compressible inclusions 5 are located in indentations of wall 1 and are covered by foil 6. Foil 6 contributes to the dissipation of the sound energy by its own inner losses during deformation.

Figure 3:
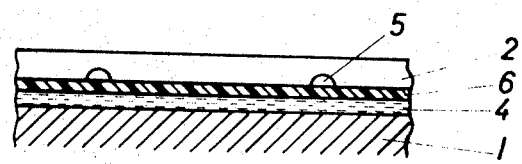
FIG. 3 is a similar view of a further embodiment of the present invention according to which the compressible inclusions are arranged in the surface layer.

FIG. 3 shows the compressible inclusions 5 in the surface of cover layer 2 which faces liquid 4. Here again, the surface which contains the inclusions is covered by a foil 6. However, the covering of the compressible inclusions by foil 6 is not absolutely necessary in this case. The purpose of foil 6 is only to prevent continuous movement of gaseous inclusions which might lead to agglomeration into a lesser number of larger gas bubbles, which agglomeration, of course, should be prevented.

Figure 4:
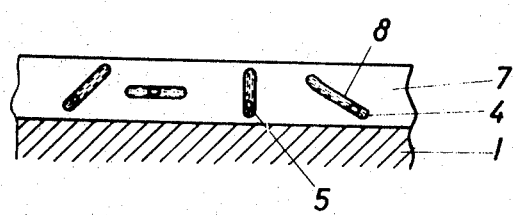
FIG. 4 is a similar view of yet another embodiment of the present invention according to which the carrier layer of the sound absorber is formed with channels containing liquid and compressible inclusions.

FIG. 4 shows a sound absorber in which the carrier material 7 serves simultaneously as the surface layer and in which small channels 8 are located in carrier material 7 in a random or statistical arrangement. Liquid 4 and compressible inclusions 5 are located within channels 8. Under the influence of the pressure caused by the sound waves, liquid will flow in these narrow channels towards the portions thereof which are occupied by the compressible inclusions 5, compressing the same. By this flow, the sound energy will eventually be converted into heat.

Liquid layer 4 may consist of glycerine or of a suitable softened plastic material. The carrier material may be rubber or a soft synthetic material. It is important that liquid 4 is so chosen that it will not be absorbed by surrounding material 7 and that it will not react physically or chemically with the same since by such reaction or absorption, the resilient properties of the materials 7 and and the viscosity of liquid layer 4 as well as the dimensions of the same would change. The compressible inclusions 5 may consist of foam rubber or particles of foamed synthetic materials, particularly if carrier material 7 is a pourable or sprayable synthetic material. When rubber is used as carrier material 7, then the compressible inclusions may be formed by gas or air-filled cavities in the rubber layer. The cover layer 2 may be a rubber layer or an aluminum foil. The thickness of the entire arrangement preferably will be below 1 cm., in other words, in relation to the wave lengths of acoustic waves in water at 10 kHz. will be less than $\lambda/15$ and correspondingly at 1 kHz. less than $\lambda/150$. The compressible inclusions 5 preferably will have a volume of between 0.1 and 1 cm.³ and the liquid layers 4 within carrier material 7 preferably will have a thickness of about 0.1 mm. and a square area of several square centimeters.

Figure 5:
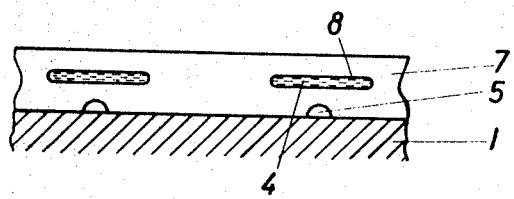
FIG. 5 is a similar view of an additional embodiment of the present invention according to which liquid-filled channels and compressible inclusions are arranged in the carrier layer of the sound absorber in a regular pattern.

FIG. 5 illustrates another embodiment of the sound absorber according to the present invention. According to FIG. 5, carrier material 7 covers wall 1 and channels 8 containing liquid 4, and compressible inclusions 5 are located in carrier material 7. According to the embodiment illustrated in FIG. 5, channels 8 and compressible inclusions 5 are arranged in a regular pattern.

Figure 6:
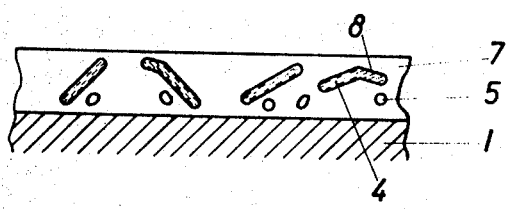
FIG. 6 is a similar view of yet another embodiment of the present invention which differs from the embodiment illustrated in FIG. 5 by having the channels and compressible inclusions located in the carrier layer in a random arrangement.

The sound absorber according to FIG. 6 is somewhat similar to that of FIG. 5, with the exception that channels or narrow spaces 8 as well as compressible inclusions 5 are arranged in random or statistical distribution. An absorber according to FIG. 6 is generally obtained by using the above-described spraying method for producing the sound absorber.

According to the different embodiment of the sound absorber of the present invention illustrated in FIG. 7, liquid-filled channels or flat spaces 8 are arranged as cutouts in carrier material 7. This type of absorber is particularly suitable for absorbing liquid-borne sound waves because the liquid through which the sound waves travel can enter the cutouts 8 so that liquid-filled channels or flat spaces are formed which coact with the compressible inclusions 5 located in carrier layer 7.

Referring again to the sound absorber of FIG. 1 in which an oscillating flow of liquid takes place preferably in a direction perpendicular to that of the sound waves which are to be absorbed, such sound absorber may include a liquid layer having a thickness of about 0.5 mm. and consisting of a highly viscous silicone oil. Flat compressible inclusions consisting of foamed material and having a diameter of about 5 mm. are embedded in the liquid layer so that the centers of adjacent foamed bodies are spaced from each other at an average distance of about 1.5 cm. The foamed bodies are adhered to wall 1 by means of a conventional adhesive which is not affected by the silicone oil. In the direction towards the medium through which the sound waves pass, the silicone oil layer is covered with a foil of synthetic material having a thickness of about 0.5 mm. At its other side, the silicone oil layer is covered either by the wall which is to be protected or by a sufficiently heavy metal wall, for instance formed of iron plates having a thickness of 1 cm.

FIG. 10 illustrates the efficiency of such a sound absorber over various ranges of frequency and it can be seen that the reflection coefficient over the entire range equals about 10 percent.

According to a further embodiment of the present invention, the sound absorber does not require the incorporation of liquids or the like. The energy conversion or energy loss is accomplished by utilizing a carrier material which is incompletely cross-linked and it furthermore may be softened by incorporation of suitable softeners. The incomplete cross-linking with or without additional softening will cause an increase in the mechanical losses due to viscous flow of the components of the partially cross-linked materials which are present in excess, and/or through additional relaxation mechanism. These additional losses appear over a very broad range of frequency and thus permit absorption of sound waves over a very broad range of frequency with relatively thin absorber layers.

For broad range frequency sound absorption by means of a thin layer, the losses which are caused by the viscosity of the layer play an important part according to the presently discussed embodiment of the present invention, provided further that the absorption material is free of uncontrollable gas bubbles, i.e. free of gas bubbles except in the desired compressible inclusions which serve to achieve the required tangential stress.

Thus, according to the presently discussed embodiment, the thin sound absorber for a broad range of frequencies and with very little reflection, consists of a cross-linkable dissipative synthetic material which is incompletely cross-linked and which, in addition thereto, may be softened, and of compressible inclusions located in contact with the incompletely cross-linked synthetic material. According to one embodiment, the compressible inclusions consist of closed cell foam rubber or foamed plastic bodies and the highly dissipative incompletely cross-linked synthetic material is free of bubbles.

As absorptive material according to this embodiment of the present invention, a pourable mass consisting of two or more components is used which in unhardened condition remains highly fluid for a sufficiently long period of time to permit pouring of a bubble-free layer. Furthermore, the pourable mass is to be such that even after hardening, the same contains a considerable proportion of highly viscous constituents and thus will be capable of causing increased mechanical losses of sound energy. In order to obtain in the sound absorber layer this viscous constituent, the pourable mass is not composed of stoichometric proportions of its components, but with an insufficient proportion of hardener. It is achieved thereby that even after completion of hardening, the mass will be incompletely cross-linked. The required compressible inclusions are preferably represented by small closed cell form rubber bodies which may be embedded in the absorber layer. By using suitable molds, sound absorbing plates in any desired size and shape can be cast. Thereby it is possible to use the bottom of the mold as the backing of the sound absorbing layer formed therein. By insertion of a foil into the mold, prior to pouring of the two or more component systems which upon hardening will form an incompletely cross-linked body, it is possible to cast a plate which can be removed from the mold and which may be pasted onto the wall which is to be protected somewhat in the manner of hanging wallpaper. However, it is also possible to spray or brush the absorber layer onto the wall which is to be protected, preferably in several successive applications in order to obtain a uniform thickness of the absorber layer.

Furthermore, the thus formed absorber layer has to be covered at its free face, which is directed towards the medium through which the sound waves travel toward the absorber layer, with a liquid-resistant lacquer or other liquid-resistant covering which may also consist of solid material such as, for instance, a foil of aluminum alloy. This is particularly important in connection with the many applications of the presently described sound absorber wherein the same is exposed to a liquid which constitutes the medium through which the sound waves travel. Such covering lacquer or foil is necessary in many cases because frequently the cross-linked absorber material which is to a very considerable extent incompletely cross-linked and which may be softened, has only a relatively very low resistance against absorption of liquid and giving up of softener.

The sound absorber according to the presently discussed embodiment is illustrated in FIGS. 8 and 9.

According to FIG. 8, a thin layer of a firmly adhering adhesive 16 is sprayed or brushed onto the surface of wall 11 which is to be protected. Adhesive layer 16 serves for adhering in the desired distribution pattern the closed cell cellular bodies such as foam rubber pieces 15 to wall 11. Care should be taken that adhesive layer 6 will be free of gas bubbles. Thereafter, pourable mass 14 consisting of two or more components and being in highly fluid condition is poured on so as to form a layer of desired thickness. After hardening of pourable mass 14, the free face thereof is covered with a liquid-resistant lacquer or other liquid-resisting covering 12 in order to protect absorber layer 14 against attack by the liquid medium 13 bearing the sound waves indicated by arrows.

If it is desired to obtain a sound absorber layer more or less in the shape of wallpaper, then the absorber layer 14 and the compressible bodies 15 are adhered, as shown in FIG. 9, to a bondable foil 17 by means of adhesive layer 16, and the thus formed absorber structure including layers 12, 14, 16 and 17, and compressible bodies 15 may then be adhered to wall 11 by means of adhesive layer 18.

The sound absorber according to FIG. 8 may be produced by adhesively adhering to the wall which is to be protected or to a heavy iron plate foam plastic bodies having a height of about 4 mm. and a diameter of about 5 mm. so that the distance between adjacent foam plastic bodies will be about 15 mm. Thereafter, a pourable mass of incompletely cross-linked silicon rubber is poured. The silicone rubber contains small particles having a size of about 1 mm. of a permanently plastic puttylike polyisobutylene material commercially available under the trade name "Prestik." The preparation of the particles equals about 20 percent of the combined volume of the silicon rubber and these particles. A thin aluminum foil is then applied to the free face of the absorber layer, or, after hardening of the incompletely cross-linked absorber layer, a water-resistant lacquer is applied to the free face thereof. The total thickness of this absorber arrangement will be 8 mm.

FIG. 11 illustrates the efficiency of the last described absorber layer and it will be seen that with increasing frequencies, the reflection coefficient of the same drops considerably below 10 percent.

It will be understood that each of the elements described above, or two or more together, may also find a useful application in other types of sound absorbers differing from the types described above.

While the invention has been illustrated and described as embodied in a sound absorber effective over a broad range of frequencies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing a sound absorber adapted to absorb sound waves of a broad range of frequencies, the steps of applying an adhesive layer to a support; adhering by means of said adhesive layer to said support a plurality of compressible closed cell cellular bodies; and applying to said adhesive layer with said compressible bodies thereon a coating of an incompletely cross-linked, cross-linkable, strongly dissipative material without forming gas bubbles within the same, so as to completely cover said support and said compressible bodies.

2. In a method of producing a sound absorber adapted to absorb sound waves of a broad range of frequencies, the steps of applying an adhesive layer to a support; adhering by means of said adhesive layer to said support a plurality of compressible closed cell cellular bodies; and applying to said adhesive layer with said compressible bodies thereon a coating of an incompletely cross-linked, cross-linkable, softener-containing, strongly dissipative material without forming gas bubbles within the same, so as to completely cover said support and said compressible bodies.

3. In a method of producing a sound absorber adapted to absorb sound waves of a broad range of frequencies, the steps of applying an adhesive layer to a support; adhering by means of said adhesive layer to said support a plurality of compressible closed cell cellular bodies; applying to said adhesive layer with said compressible bodies thereon a coating of an incompletely cross-linked, cross-linkable, strongly dissipative material without forming gas bubbles within the same, so as to completely cover said support and said compressible bodies; and adhering a corrosion and erosion resistant layer to the free face of said incompletely cross-linked coating.

* * * * *